(12) United States Patent
Kotlarski

(10) Patent No.: US 6,363,569 B1
(45) Date of Patent: *Apr. 2, 2002

(54) DEVICE FOR CONNECTING A WIPER BLADE FOR WINDSHIELDS IN MOTOR VEHICLES TO A WIPER ARM

(75) Inventor: Thomas Kotlarski, Bad Neuenahr (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/509,395

(22) PCT Filed: Jul. 21, 1999

(86) PCT No.: PCT/DE99/02250

§ 371 Date: May 15, 2000

§ 102(e) Date: May 15, 2000

(87) PCT Pub. No.: WO00/06432

PCT Pub. Date: Feb. 10, 2000

(30) Foreign Application Priority Data

Jul. 27, 1998 (DE) .......................... 198 33 665

(51) Int. Cl.$^7$ ................................. B60S 1/40
(52) U.S. Cl. .................. 15/250.32; 15/250.43
(58) Field of Search ................ 15/250.32, 250.31, 15/250.33, 250.43, 250.44, 250.451, 250.361

(56) References Cited

U.S. PATENT DOCUMENTS

| 2,056,777 A | 10/1936 | Evans | 15/250.32 |
| 3,576,044 A | * 4/1971 | Besnard | 15/250.32 |
| 3,872,537 A | 3/1975 | Bianchi | 15/250.32 |
| 4,120,069 A | 10/1978 | Bernard | 15/250.32 |
| 4,132,490 A | * 1/1979 | Journee | 15/250.32 |

FOREIGN PATENT DOCUMENTS

| CA | 721443 | * 11/1965 | 15/250.32 |
| CA | 966610 | * 4/1975 | 15/250.32 |
| DE | 44399 | * 7/1956 | 15/250.32 |
| DE | 2 344 876 | 3/1974 | |
| DE | 2604325 | * 8/1977 | 15/250.32 |
| DE | 297 12 293 U | 11/1993 | |
| GB | 920059 | * 3/1963 | 15/250.32 |

* cited by examiner

Primary Examiner—Gary K. Graham
(74) Attorney, Agent, or Firm—Michael J. Striker

(57) ABSTRACT

An apparatus for connecting a wiper blade for windows of motor vehicles to a driven wiper arm guided on one end of a motor vehicle with a free end of the wiper arm being pivotably connectable to a support element for an elongated, rubber-elastic wiper strip that can be applied to a window, has a connection unit of a wiper blade including one journal protruding from each of long sides of the support element, with a common longitudinal axis of both journals located transversely to a length of the support element in a plane parallel to the window, each of the journals engaging a bearing recess of the wiper arm, which recess forms a connection unit of the wiper arm, each of the bearing journals being introducible via a respective mounting that is open at an edge and opens into the bearing recess, each of the journals being formed of at least two spaced-apart, elastically deflectable journal parts, and a width of each mounting channel being less than a least journal dimension measured transversely to a longitudinal journal axis.

10 Claims, 2 Drawing Sheets

DEVICE FOR CONNECTING A WIPER BLADE FOR WINDSHIELDS IN MOTOR VEHICLES TO A WIPER ARM

BACKGROUND OF THE INVENTION

The invention is based on an apparatus. In a known apparatus of this kind (German published, Nonexamined Patent Application DE-OS 23 44 876), the swivel journals of the blade, after the wiper blade has been mounted on the wiper arm, engage holes in the arm. This reference makes no statement about the mounting process. Possibly the two journals are formed by the ends of a bolt that protrude from the block of the retainer, the bolt being inserted after the connection parts have been put together, so that the ends of the bolt rest in the holes of the arm. This kind of connection entails considerable effort in mounting, not only the first time the wiper blade is mounted on the wiper arm but also when it is later necessary to change wiper blades.

SUMMARY OF THE INVENTION

In keeping with these objects and with others which will become apparent hereinafter, one feature of present invention resides, briefly stated, in an apparatus in which each of bearing journals is introducible via a respective mounting channel that is open at the edge and opens into the bearing recess associated with it, and each of the journals is formed of at least two spaced-apart elastically deflectable journal parts, wherein the width of each mounting channel is less than the least journal dimension measured transversely to the longitudinal journal axis.

In the apparatus of the invention it is possible to introduce the journals into their bearing recess via the two mounting channels assigned to journals; on passing through the channels, the journal parts temporarily deflect elastically and then spring back automatically in the bearing recesses into their outset position. For mounting, no special elements such as pivot bolts are thus needed. Unmounting likewise requires merely a force oriented counter to the introduction direction, and this force causes a corresponding deflection of the journal pats for passing through the mounting channels.

In a first embodiment of the invention which is especially reliable in operation and is suited primarily for wiper systems with a wiper arm that can be hinged away from the window, both of the journals, each formed of the journal parts, are provided each with two opposed flat faces, located inside an imaginary annular jacket face and aimed at the window, and the spacing between the two journal parts is formed by a slit that extends at least far as a carrier, made of an elastic plastic, for the journals joined integrally to it, and which slit is disposed between the two flat faces.

It can be advantageous if the mounting channels extend substantially parallel to the surface of the window.

For wiper systems with a wiper arm that can be lifted only slightly away from the window—of the kind provided for instance in systems where the wiper blade has a parking position located under the apron of the vehicle hood—an easily accomplished connection between the wiper blade and the wiper arm is obtained if the mounting channels extend from the bearing recesses to the surface of the window.

An expedient embodiment of the invention provides that the spacing between the journal parts is formed by a slit, which extends at least as far as a carrier, made of an elastic plastic, for the journals integrally joined to it, and which slit is oriented pointing at the surface of the window.

Mounting the wiper blade to the wiper arm is facilitated if in that the respective side walls, facing one another, of the mounting channels diverge beginning at the bearing recesses. To keep the structural height of the wiper blade low, the support element is embodied as a bandlike-elongated rail of a spring elastic material, on which the wiper strip is retained with its longitudinal axis parallel. Further advantageous refinements and features of the invention are described in the ensuing description of exemplary embodiments shown in the accompanying drawing.

DESCRIPTION OF THE PREFERRED EMBODIMENTS

Figure 1:
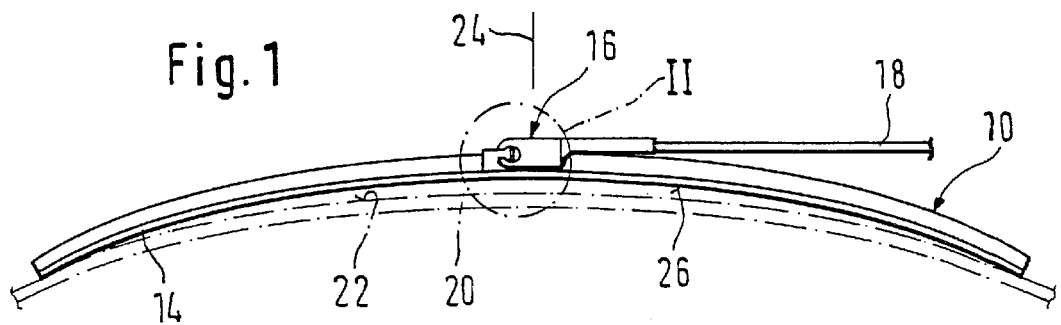
FIG. 1, a side view of a wiper blade, connected to a wiper arm by a connection apparatus of the invention.

A wiper blade 10 shown in FIG. 1 has a bandlike-elongated, spring-elastic support element (FIG. 2), on whose underside 13 an elongated, rubber-elastic wiper strip 44 is secured with its longitudinal axis parallel. On the top side 11 of the support element 12, which can also be called a spring rail, in its middle portion, the part 15 belonging to the wiper blade of a connection device 16 is disposed, with the aid of which the wiper blade 10 can be pivotably and detachably connected to a driven wiper arm 18. To that end, the wiper arm 18 is provided on its free end with the part 19 toward the wiper arm of the connection device 16. The wiper arm 18 is urged in the direction of arrow 24 toward the window 20 to be wiped—for instance, the windshield of a motor vehicle—whose surface is suggested in FIG. 2 by a line 22. Since the line 22 is meant to represent the greatest curvature of the window surface, it is quite apparent that the curvature of the as yet unstressed wiper blade, resting with both ends on the window, is greater than the maximum window curvature (FIG. 1). Under the contact pressure (arrow 24), the wiper blade 10 presses with its wiper lip 26 against the window surface 22 over the full length of the wiper blade. In the spring-elastic support element 12, made of metal, a tension builds up in the process, which assures a proper contact of the wiper strip 14, or wiper lip 26, over its entire length with the window and assures a uniform distribution of the contact pressure 20 (arrow 24). Because the window, which as a rule is spherically curved, is not part of a surface of a sphere, the wiper blade 10 must be capable of adapting constantly to the position at the time of the window surface relative to the wiper arm 18 during its wiping motion. The connection device 16 is therefore simultaneously embodied as a swivel connection between the wiper blade and the wiper arm.

A first embodiment of the connection between the support element 12 and the wiper arm 18 will now be described in further detail in conjunction with FIGS. 1–4. The coupling parts 15 and 19 of the wiper arm in the wiper blade belong to the connection device 16, as already noted. The coupling means of the wiper blade, in this exemplary embodiment, are embodied on a coupling part 15 which belongs to the support element and is solidly connected to the support element 12. Opposed journals 32 pointing away from one another are disposed on the coupling part 15, which is made of an elastic plastic; on the one hand, these journals engage coupling means of the wiper arm, and on the other, as bearing journals, they assure a swiveling connection between the wiper arm 18 and the wiper blade 10. To that end, the journals 32 have the same longitudinal axis or pivot axis 35, which extends substantially in the displacement direction of the wiper blade 10 during wiper operation and thus parallel to the window surface 22. The pivot axis 35 extends crosswise to the longitudinal axis of the elongated wiper blade 10, which during wiper operation is displaced transversely to its length over the window 20 to be wiped. As shown particularly in FIGS. 2–4, the two journals 32 in this exemplary embodiment are formed of two journal parts 34 and 36, spaced apart from one another by a distance formed by a slit 38. Each of the two journals 32 is provided with two opposed flat faces 40 and 42, located inside an imaginary annular jacket face and aimed at the window 22, with the slit 38 located between them. The slit extends as far as the coupling part 15, acting as a carrier for the two journals 32, or can extend into the coupling part 15. The two flat faces 40 and 42, each of which is disposed on one of the two journal parts 34 and 36, are located at a spacing 44 (FIG. 4) from one another. The width of the slit—which width defines the spacing between the two journal parts 34 and 36—has been identified by reference numeral 46 in FIG. 2.

Figure 2:
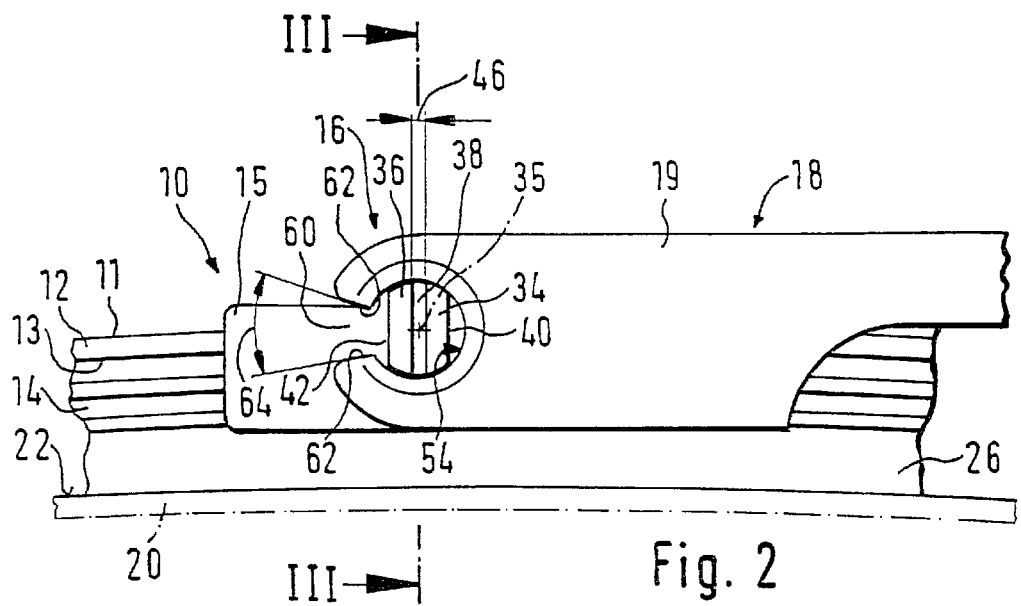
FIG. 2, an enlarged view of a detail marked II in FIG. 1.
Figure 3:
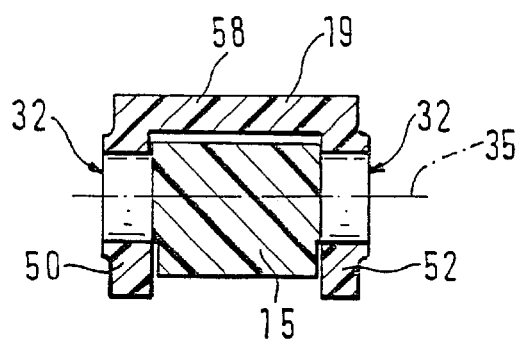
FIG. 3, a basic illustration of a sectional plane taken along the line III—III in FIG. 2 through the connection apparatus.

The coupling part 19 of the wiper arm and belonging to the connection device 16 is made of a comparatively nonresilient, wear-resistant material, such as a plastic, and is solidly joined to the wiper arm 18 so that in practical terms it belongs to it. As FIG. 3 shows, it has a substantially U-shaped cross section; both of the legs 50 and 52 of its U are each provided with a respective bore 54, and these bores are aligned with one another and their common axis is identical to the common axis 35 of the bearing journals 32, once the wiper blade 10 has been joined to the wiper arm 18. Thus the bores 54 form the connection and bearing means of the wiper arm for the connection and bearing means 32 of the wiper blade. The jacket faces 56 of the bores 54 form slide bearing faces, which cooperate with the outer jacket faces of the bearing journals 32. The annular jacket face 56 thus also forms the annular jacket face inside which the flat faces 40 and 42, aimed at the window, of the bearing journals 32 are disposed. It can also be seen from FIG. 3 that the legs 50 and 52 of the U of the coupling part 19, in the mounted position of the apparatus, fit over both side faces, remote from one another, of the coupling part 15. The base 58 of the U that joins the two legs 50 and 52 of the U forms a cover plate, which largely protects the journal bearings from the invasion of road dirt. The bearing bores 54 are each open at the rim via a respective mounting channel 60, so that via the mounting channels 60, the bearing journals 32 can be introduced into their bearing bores 54. As seen from FIG. 2, the side faces 62 facing one another diverge by an acute angle 64 from one another. The narrowest point of the mounting channels can be seen in FIG. 4, where it is identified by reference numeral 66. This dimension is less than the dimension 44 that indicates the spacing between the two flat faces 40 and 44. The width 46 of the slits 38, however, is greater than the difference between the dimension 44 and the dimension 66. As FIG. 2 shows, the mounting channels 60 extend substantially parallel to the surface 22 of the window 20.

Figure 4:
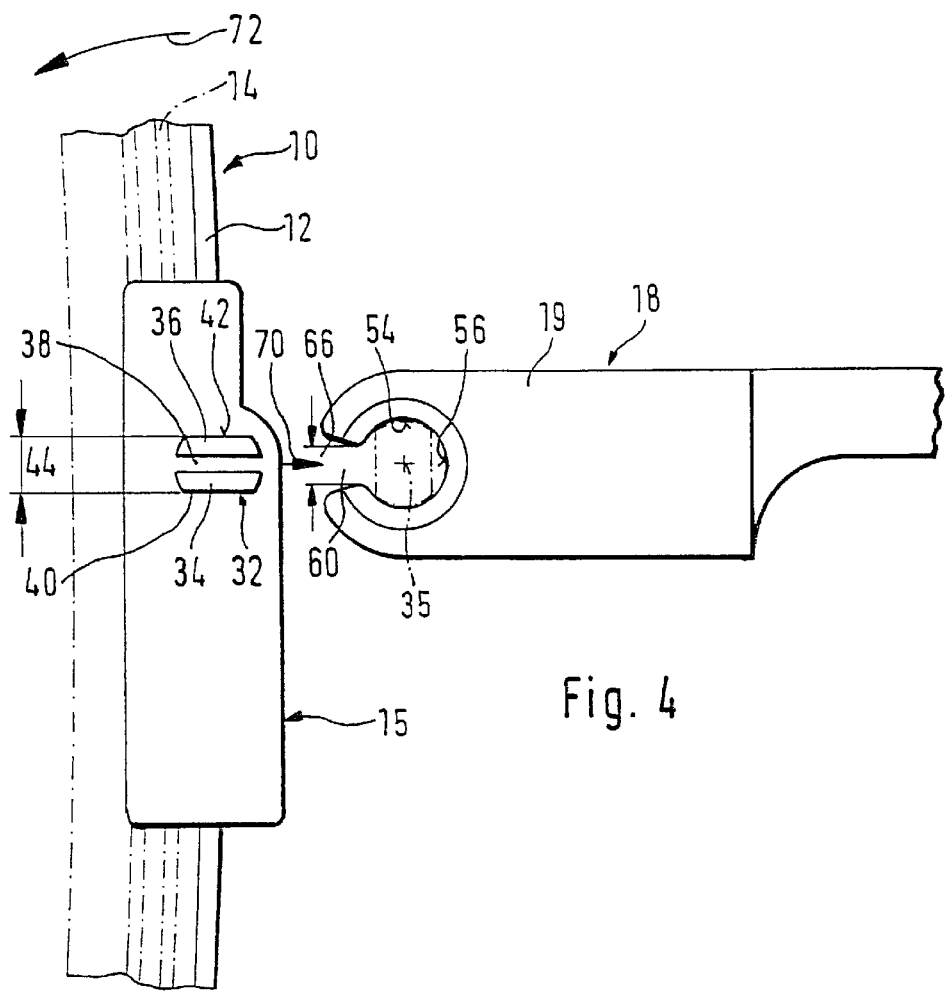
FIG. 4, the connection apparatus of FIG. 2 in a premounting position.

The work steps for connecting the wiper blade 10 to the wiper arm 18 will now be explained in conjunction with FIG. 4. The wiper blade 10 must first be put in a mounting position relative to the wiper arm 18, which has been hinged away from the window, that is shown in FIG. 4. After that, the wiper blade is displaced in the direction of the arrow 70, causing the bearing journals 32 to enter the mounting channels 60. The side walls 62, converging in funnel-like fashion, mounting channels catch the journals 32 in the process and guide them securely to the narrowest point 60 of the mounting channels. At elevated pressure in the direction of the arrow 70, the two journal parts 34 and 36 now deflect elastically out of the position shown in FIG. 4; the width 46 of the slits 38 is decreased to such an extent that the dimension 44 is equivalent to the dimension 66, and the journals 32 enter their bearing bores 54, where they spring back into their outset position again. After that, the wiper blade is swiveled in the direction of the arrow 72 in FIG. 4, so that it reaches its operating position, shown in FIG. 2, in which it is now held securely yet in a way capable of swinging like a pendulum about the axis 35. This operating position of the journals 32 in their bearing bores 54 is indicated by dot-dashed lines in FIG. 4.

Figure 5:
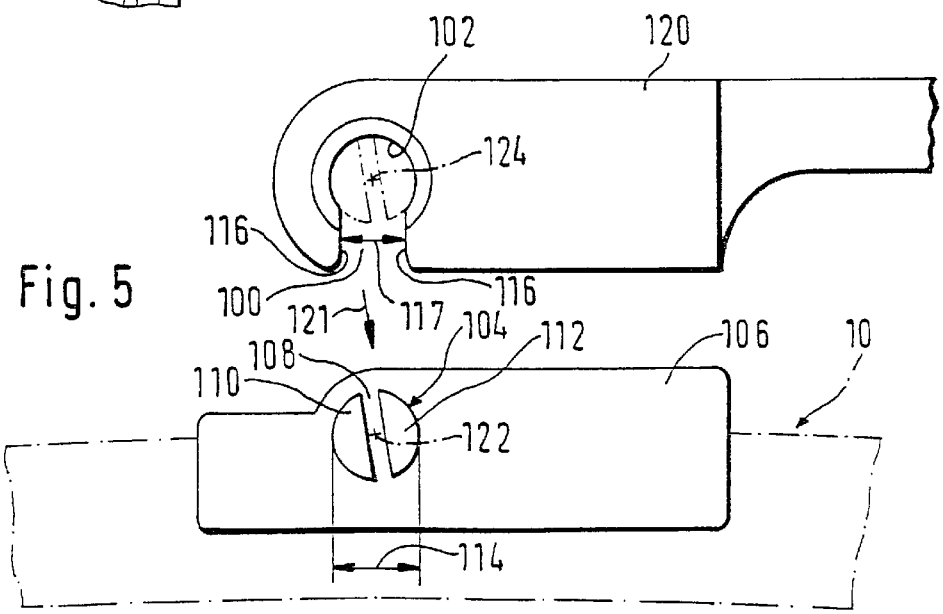
FIG. 5, another embodiment of the connection apparatus of the invention, shown in the premounting position.

In another embodiment, shown in FIG. 5, of the connection apparatus of the invention, in a departure from the exemplary embodiment just described, the mounting channels 100 are oriented from the bearing recesses 102 to the window to be wiped. The two bearing journals 104, as in the embodiment of FIGS. 2–4, are slitted as far as the coupling part 106, and the slits 108 again extend toward the surface of the window or are extended into the coupling part 106. This accordingly creates two spaced-apart journal parts 110, 112, which together form the two journals 104 with a journal diameter 114. The side walls 116, facing one another, of the mounting channels 100 are spaced apart by a distance 118 from one another that is less than the diameter 114 of the journals 104. The width of the slits 108 is somewhat greater than the difference between the journal diameter 114 and the width 117 of the mounting channels 100.

In this embodiment as well, both the coupling part 106 and the swivel journal 104 integrally joined to it are made of an elastic material, while the coupling part 120 of the wiper arm is made from a wear-resistant, nonresilient material.

For connecting the wiper blade 10 to the wiper arm, for instance to the coupling part 120 solidly joined to the wiper arm, the wiper arm merely has to be lifted away from the window by a dimension that allows the insertion of the wiper blade between the wiper arm and the window. After that, the wiper arm is moved in the direction of the arrow 121 (FIG. 5); the coupling part 120, fitting over the apparatus part 106 of the wiper blade, is then placed with the openings of the mounting channels 100 on journals 104. By means of a slight pressure in the direction of the arrow 121, the journal parts 110, 112 of the swivel journals 104 are deflected toward one another, until the dimension 114 is equal to the width 117 of the mounting channels 100. After that, the journals 104 enter their bearing bores 102—as shown in dot-dashed lines in FIG. 5—and then the common journal axes 122 coincide with the common bore axes 124, so that a swinging motion of the wiper blade about this axis is possible. Naturally the side cheeks 116 can diverge toward the window in this version as well.

The pivot journals 32 and 104 thus form connection means and at the same time bearing elements between the wiper arm 18 and the wiper blade 10. It is a common feature of both exemplary embodiments that each of the two journals 32 and 104 is formed of at least two elastically deflectable journal parts 34, 36 on the one hand and 110, 112 on the other, the two journal parts of each pair being spaced apart by a distance 46, and that the width 66 and 117 of each mounting channel 60 and 100, respectively, is less than the least journal dimension 44 and 114, measured transversely to the longitudinal journal axis 35. The least journal dimension is measured at the point where the respective journals 32 and 104, in the mounting position, slide along the mounting channel walls 62 and 116.

What is claimed is:

1. An apparatus for connecting a wiper blade for windows of motor vehicles to a driven wiper arm guided on one end on a motor vehicle, with a free end of the wiper arm being pivotably connectable to a support element for an elongated, rubber-elastic wiper strip that can be applied to a window, the apparatus has connection means of the wiper blade including one journal protruding from each of long sides of the support element, with a common longitudinal axis of both journals located transversely to a length of the support element in a plane parallel to the window, each of the journals engaging a bearing recess of the wiper arm, which recess forms connection means of the wiper arm, each of the journals being introducible via a respective mounting channel that is open at an edge of the wiper arm and opens into the bearing recess, each of the journals being formed of at least two spaced-apart, elastically deflectable journal parts, and a width of each mounting channel being less than a least journal dimension of the spaced journal parts measured transversely to a longitudinal journal axis.

2. An apparatus as defined in claim 1, wherein the journals are each formed of the journal parts provided each with two opposed flat faces located inside an imaginary annular jacket face spacing between the two journal parts being formed by a slit that extends at least far as a coupling part composed of elastic plastic for the journals, and the slit being disposed between the two flat faces.

3. An apparatus as defined in claim 1, wherein the mounting channels are formed so that they are adapted to extend substantially parallel to a surface of the window.

4. An apparatus as defined in claim 1, wherein the mounting channels are formed so that they are adapted to extend from the bearing recesses towards a surface of the window.

5. An apparatus as defined in claim 4, wherein a spacing between the journal parts is formed by a slit which extends at least as far as a coupling part made of an elastic plastic for the journals, the slit being oriented pointing towards a surface of the window.

6. An apparatus as defined in claim 1, wherein the mounting channels have side walls facing one another and diverging from one another beginning at the bearing recesses.

7. An apparatus as defined in claim 1, wherein the support element is formed as a band-shaped, elongated rail of a spring elastic material, on which the wiper strip is retained with a longitudinal axis extending parallel to the band-shaped elongated rail.

8. A wiper blade for windows of motor vehicles, comprising an elongated, rubber-elastic wiper strip applicable to a window; a support element having a longitudinal side on which the wiper strip is arranged, the support element having two further longitudinal sides provided with connecting means which are operative for connecting a wiper arm thereto, the connecting means including two journals having a common longitudinal axis extending transversely to an extension of the support element, each of the journals being formed of at least two spaced-apart, elastically deflectable journal parts, so that the journals are insertable into corresponding mounting channels formed on the wiper arm and said channels being smaller than the least journal dimension measured transversely to the longitudinal axis of the journals.

9. A wiper blade as defined in claim 8, wherein the journals each formed of the two journal parts are provided each with two opposed flat faces located inside an imaginary annular jacket face, with a space between the two journal parts being formed by a slit that extends at least as far as a coupling part composed of elastic plastic for the journals, and the slit being disposed between the two flat faces.

10. A wiper blade as defined in claim 8, wherein the support element is composed of a plural ity of parts.

* * * * *